(12) United States Patent
Bahnmüller et al.

(10) Patent No.: US 10,871,143 B2
(45) Date of Patent: *Dec. 22, 2020

(54) VERTICAL AXIS WIND TURBINE AND METHOD FOR OPERATING SUCH A TURBINE

(71) Applicant: Agile Wind Power AG, Dubendorf (CH)

(72) Inventors: Karl Bahnmüller, Dietikon (CH); Hans Thomas Hug, Weisslingen (CH)

(73) Assignee: Agile Wind Power AG, Dubendorf (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,605

(22) Filed: Oct. 19, 2018

(65) Prior Publication Data

US 2019/0186461 A1 Jun. 20, 2019

Related U.S. Application Data

(63) Continuation of application No. 15/316,650, filed as application No. PCT/EP2015/059392 on Apr. 29, 2015, now Pat. No. 10,132,293.

(30) Foreign Application Priority Data

Jun. 6, 2014 (CH) .................................... 0868/14

(51) Int. Cl.
*F03D 3/06* (2006.01)
*F03D 7/06* (2006.01)
(Continued)

(52) U.S. Cl.
CPC ............. *F03D 3/068* (2013.01); *F03D 3/005* (2013.01); *F03D 3/02* (2013.01); *F03D 7/06* (2013.01);
(Continued)

(58) Field of Classification Search
CPC . F03D 3/02; F03D 3/005; F03D 3/068; F03D 9/25
See application file for complete search history.

(56) References Cited

U.S. PATENT DOCUMENTS 2,038,467 A 4/1936 Zanoski
3,902,072 A 8/1975 Quinn
(Continued)

FOREIGN PATENT DOCUMENTS

CN 201943888 * 8/2011
CN 201943888 U 8/2011
(Continued)

OTHER PUBLICATIONS

Translation of WO 2007/143918 A1.*
Translation of CN201943888.*

*Primary Examiner* — Sean Gugger
(74) *Attorney, Agent, or Firm* — The Webb Law Firm

(57) ABSTRACT

A vertical axis wind turbine includes two or more cells arranged one above the other along a vertical machine axis, wherein each of the cells includes a plurality of vertical blades which are arranged within the cell distributed on a concentric circle about the machine axis and which are connected so as to be able to move together on this circle and which are rotationally fixed with a main shaft, and wherein the blades in the cell are each individually mounted so as to be able to rotate about a vertical axis of rotation which in particular runs internally through them.

28 Claims, 11 Drawing Sheets

(51) Int. Cl.
*F03D 3/00* (2006.01)
*F03D 3/02* (2006.01)
*F03D 9/25* (2016.01)
*H02K 7/18* (2006.01)

(52) U.S. Cl.
CPC .............. *F03D 9/25* (2016.05); *H02K 7/183* (2013.01); *F05B 2260/503* (2013.01); *F05B 2260/505* (2013.01); *F05B 2260/507* (2013.01); *F05B 2260/5032* (2013.01); *F05B 2260/71* (2013.01); *F05B 2260/72* (2013.01); *F05B 2260/76* (2013.01); *F05B 2260/79* (2013.01); *F05B 2270/32* (2013.01); *F05B 2270/321* (2013.01); *F05B 2270/326* (2013.01); *F05B 2270/327* (2013.01); *F05B 2270/808* (2013.01); *Y02E 10/74* (2013.01)

(56) References Cited

U.S. PATENT DOCUMENTS

| | | | |
|---|---|---|---|
| 4,410,806 A * | 10/1983 | Brulle | F03D 7/06 290/44 |
| 4,494,007 A | 1/1985 | Gaston | |
| 4,530,642 A * | 7/1985 | Yang | F03D 3/068 416/119 |
| 4,609,827 A | 9/1986 | Nepple | |
| 4,618,312 A | 10/1986 | Williams | |
| 4,832,569 A | 5/1989 | Samuelsen et al. | |
| 5,503,525 A * | 4/1996 | Brown | F03D 3/068 415/4.4 |
| 6,379,115 B1 | 4/2002 | Hirai | |
| 6,926,491 B2 | 8/2005 | Migler | |
| 7,726,934 B2 | 6/2010 | Cowan | |
| 8,410,622 B1 * | 4/2013 | Wallach | F03D 7/06 290/44 |
| 8,552,579 B2 | 10/2013 | Richter et al. | |
| 2003/0049128 A1* | 3/2003 | Rogan | F03D 3/02 416/131 |
| 2003/0235498 A1 | 12/2003 | Boatner | |
| 2007/0243066 A1* | 10/2007 | Baron | F03D 3/068 416/132 B |
| 2007/0296218 A1 | 12/2007 | Jonsson | |
| 2007/0297902 A1 | 12/2007 | Jonsson | |
| 2008/0175709 A1* | 7/2008 | Akcasu | F03B 17/065 416/131 |
| 2010/0092290 A1* | 4/2010 | Aaron | F03D 3/005 416/9 |
| 2010/0283254 A1* | 11/2010 | Richter | F03D 3/067 290/55 |
| 2011/0135443 A1 | 6/2011 | Cucci et al. | |
| 2014/0178216 A1 | 6/2014 | Richter et al. | |

FOREIGN PATENT DOCUMENTS

| | | | |
|---|---|---|---|
| GB | 2000556 A | 1/1979 | |
| WO | 9425750 A1 | 11/1994 | |
| WO | 2007143918 A1 | 12/2007 | |
| WO | WO-2007143918 A1 * | 12/2007 | ............ F03D 3/067 |
| WO | 2009086648 A2 | 7/2009 | |
| WO | 2014056875 A1 | 4/2014 | |

\* cited by examiner

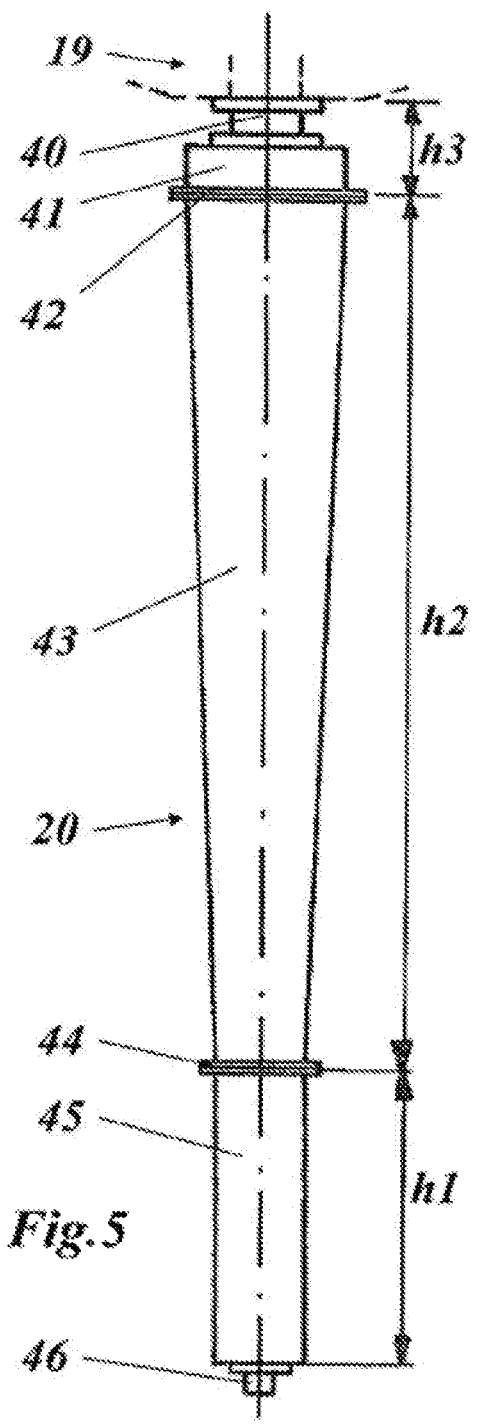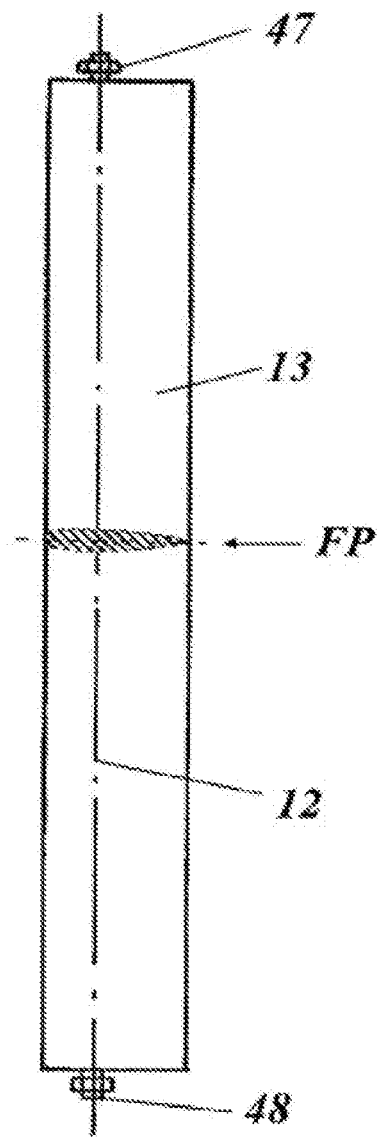

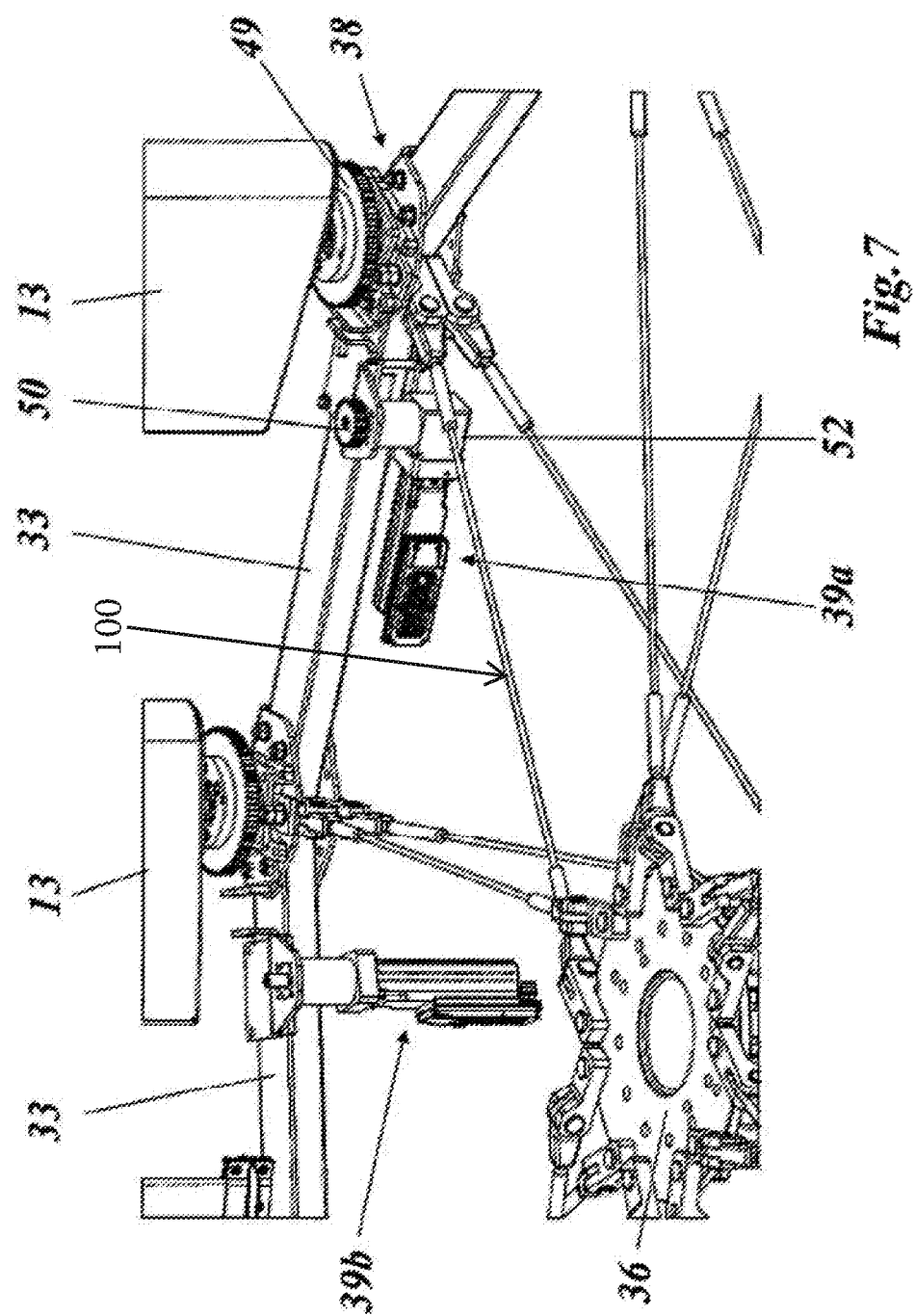

VERTICAL AXIS WIND TURBINE AND METHOD FOR OPERATING SUCH A TURBINE

CROSS-REFERENCE TO RELATED APPLICATIONS

This application is a continuation application of U.S. patent application Ser. No. 15/316,650, filed on Dec. 6, 2016, which is the United States national phase of International Application No. PCT/EP2015/059392 filed Apr. 29, 2015, and claims priority to Switzerland Patent Application No. 00868/14 filed Jun. 6, 2014, the disclosures of which are hereby incorporated in their entirety by reference.

BACKGROUND OF THE INVENTION

Field of the Invention

The present invention refers to the field of wind turbines. It refers to a vertical wind turbine and a method for operating such a turbine.

Description of Related Art

Besides the usual horizontal wind turbines which are generally provided with three blades, and which are manufactured and used in large numbers and which provide power in the MW range, vertical wind turbines are from time to time proposed, which may operate according to different principles.

U.S. Pat. No. 3,902,072 A discloses a wind turbine with a horizontal rotating platform, on which at the outer circumference a plurality of vertical blades are positioned, which all coaxially rotate both about a central axis and about their own axis. The rotation of the vertical blades takes place according to modifications of wind direction and wind speed and the rotation of each individual blade is controlled in a way that on ¾ of the rotation distance of the platform, power is generated by wind, whereas on the remaining distance the blades are set in a way to oppose a minimal resistance to the wind. The blade control is achieved by a central gear mechanism with a common servomotor.

U.S. Pat. No. 4,410,806 A describes a vertical wind turbine with a rotating structure, which includes a series of vertical rotatable blades, whose positions are controlled in such a way that a constant angular speed of the rotating structure is achieved, if wind speed is sufficiently high. A microprocessor based control processes information regarding wind speed, wind direction and speed of rotating structure and generates an electrical signal for setting the blade position. The control of the turbine includes electric blade actuators, by which the blades of the rotating structure are modulated. The blade modulation controls the angle of attack, which in turn determines the speed of the rotor. A wind speed meter provides data for starting and stopping the turbine, whereas a wind direction sensor is used in order to keep the turning over of blades at 90° and 270° with respect to the wind direction. The control is provided in order to keep a constant rotational speed at wind speeds between 19 and 40 miles per hour.

U.S. Pat. No. 4,494,007 A discloses a vertical wind turbine, wherein the orientation of blades rotating about a central common axis is controlled by a wind vane, through a common mechanism during their circulation about the central axis in such a way that, when wind speed changes, the angular position of blades is changed in a compensating direction.

U.S. Pat. No. 4,609,827 A describes a vertical wind turbine having blades with an airfoil profile. A positive and synchronous blade orientation system is controlled by a mechanism provided outside the rotor. Two devices of a new kind improve the aerodynamic efficiency and increase the rotational forces.

The wind turbine disclosed in U.S. Pat. No. 6,379,115 B1 includes three rotating rotational axes as well as a plurality of rotating support arms, provided on the axis, wherein between the support arms blades are rotationally mounted for transmitting wind force. A wind sensor measures wind direction and speed. Servomotors, which are provided on blades, control the position of blades according to the measured wind data. Various control methods are described.

US 2008175709 A1 describes a high efficiency turbine for energy generation from a wind or water flow. The turbine has a central axis with a plurality of blades, which rotate about the axis in a way similar to a vaned wheel. Each blade has a blade axis, which is parallel to the blade's longitudinal direction and to the central axis and is rotatable about the blade axis. During turbine operation, each blade adopts an angle of attack relative to flow direction, which is dynamically controlled, when the blade is rotating about the central axis, in order to maximize angular momentum of blade about the axis.

WO 2009086648 A2 finally shows a wind turbine with at least one rotor, which is rotatable about a vertical axis, and which includes a plurality of rotor blades, which are distributed along a circumferential circle and may swivel about a respective vertical swing axis, and which are provided between two horizontally positioned spaced apart and superimposed supporting planes, wherein the swinging range of rotor blades is limited on both sides by an abutment, wherein the width of the rotor blades is smaller than approximately ⅓ of radius of circumferential circle. Rotor blades may in particular be positioned on a plurality of superimposed planes.

The known vertical wind turbines are designed for winds close to the ground surface, and therefore have a relatively low total height. If, however, such an installation is designed for heights comparable to those of current horizontal wind turbines, the dependence on height of wind speed and possibly of wind direction has to be included in considerations about a most efficient energy generation.

SUMMARY OF THE INVENTION

The object of the invention is therefore to provide a vertical wind turbine, which may be also scaled to greater total heights, and which, at the same time, allows for a high efficiency with a simple and functionally reliable structure.

Another object of the invention is to provide a method for operating such a turbine.

The vertical wind turbine according to the invention includes two or more cells which are positioned, one above the other, along a vertical machine axis, wherein each cell includes a plurality of vertical blades, which are distributed inside the cell along a circumferential circle about the machine axis, and which are together movable on this circle, and are rotationally fixed to a main shaft, and wherein the blades in the cell are individually pivotally supported about a vertical rotational axis, which in particular extends inside the same. The turbine is characterized in that means are associated to each blade, with which the blade, during rotation about the machine axis, may be transferred, independently from other blades, to a predetermined angular position about its axis of rotation, which may be changed at any time.

An embodiment of the vertical wind turbine according to the invention is characterized in that each cell includes a first and second ring, which are concentrically positioned with respect to the machine axis, wherein the rings constrain the cell in an upward and downward direction, and between which the cell blades may be rotated through 360°.

The blades in one cell are in particular supported at their ends on the first and second ring in order to be rotated through 360°.

Neighboring cells may in particular share one ring.

The means for changing the angular position of blades are in particular also provided on the rings.

The means for changing the angular position of blades in particular include an electric or hydraulic motor.

The rotational movement of the electric or hydraulic motor may be in particular transmitted, in the electric motor, through gears or in case of the hydraulic motor directly to the corresponding blade.

The electric or hydraulic driven motor is in particular positioned in the ring plane, and the rotational movement between gears is transmitted, in the case of the electric drive, through a toothed belt. In the hydraulic variant, the hydraulic motor is directly connected, i.e. without the use of gears, to the blade axis of rotation.

However, it may also be conceived that the electric or hydraulic motor has a motor axis which is perpendicular to the ring plane, and that an angular gear is interposed for transmission of rotation in the case of the electric drive.

Another embodiment of the vertical wind turbine according to the invention is characterized in that the cell provided in the lowest position has a predetermined distance from the ground, and that the main shaft is rotatably supported between the lowest cell and a machine house near the ground, as well as at its ends.

In particular, the main shaft is composed of a plurality of serially arranged axial portions, and the portions are connected to each other by means of flanges.

In particular, the main shaft includes a lower cylindrical portion, a central portion, which conically extends upwards and an upper cylindrical portion, which has an outer diameter which is greater than the lower cylindrical portion.

The rotor of an electric energy generating generator is preferably non-rotatably mounted on the lower cylindrical portion.

For rotationally supporting the main shaft on the lower end of the main shaft a mounting pin is arranged and on the upper end a supporting roller track is provided. The mounting pin is provided with a thrust bearing, which absorbs the lower vertical gravitational forces of the rotor, and with a radial bearing, which absorbs the horizontal lower reaction wind forces of the main shaft.

The upper bearing of the main shaft, which is a supporting roller bearing, and which absorbs the vertical upper reaction wind forces of the main shaft, may be supported by a downwardly widening supporting frame, which rests on foundations outside the machine axis, wherein the lower axial and radial bearings of main shaft are housed in the generator housing, which is fixed to the upper struts inside the machine house, which is suspended to the supporting frame.

According to a further embodiment of the invention, a wind measuring device is respectively provided on each cell on the upper and lower side, for measuring the wind direction and speed, which device preferably includes an ultrasound anemometer. In this way the local wind effect on each blade may be determined with a good approximation.

Moreover, on each cell on the blade bearing on the upper and/or lower side a force measurement device for measuring the radial and tangential force direction may be provided, in order to determine and consider also forces acting on blades.

The method according to the invention for operating a vertical wind turbine according to the invention is characterized in that the angular position of the individual blades of the wind turbine about their axis of rotation is actively controlled independently from each other, according to measured values of wind speed, wind direction, rotational speed of wind turbine and blade position along their circular path about the machine axis.

An embodiment of the method according to the invention is characterized in that for the blade angle, which describes the deviation of blade from a base position, which is tangential to the circulation circle about the machine axis, virtual cam discs are provided, which respectively define the variation of the blade angle with blade position on the circulation circle, and that the active control of individual blades is performed according to the virtual cam discs.

In particular, for selecting the virtual cam discs used for actively controlling the blades, the tip-speed ratio $\lambda$ of the wind turbine is continually determined, wherein the tip-speed ratio $\lambda$ indicates the ratio of the peripheral speed of blade to the wind speed, and the virtual cam disc is selected, or different virtual cam discs are used for the active blade control according to the determined tip-speed ratio $\lambda$.

In particular, the virtual cam discs are referred to a zero position of the wind turbine, and the zero position is a function of the wind direction.

In particular, for each cell, a corresponding wind speed, dependent on the height above ground, is defined, and the angular position of the individual blades of cell about their axis of rotation is actively controlled according to the wind speed which is determined for the individual cell.

BRIEF DESCRIPTION OF THE DRAWINGS

The invention is explained in the following by means of exemplary embodiments in connection with the drawing. In particular:

FIG. 5 is a side view of the main shaft of turbine of FIG. 1;

FIG. 6 is a side view of a blade with an upper and lower bearing of turbines according to FIG. 1;

FIG. 7 is a perspective view of a detail of two different types of mounting an electric motor for blade adjustment on the lower blade supporting ring;

DESCRIPTION OF THE INVENTION

Figure 1:
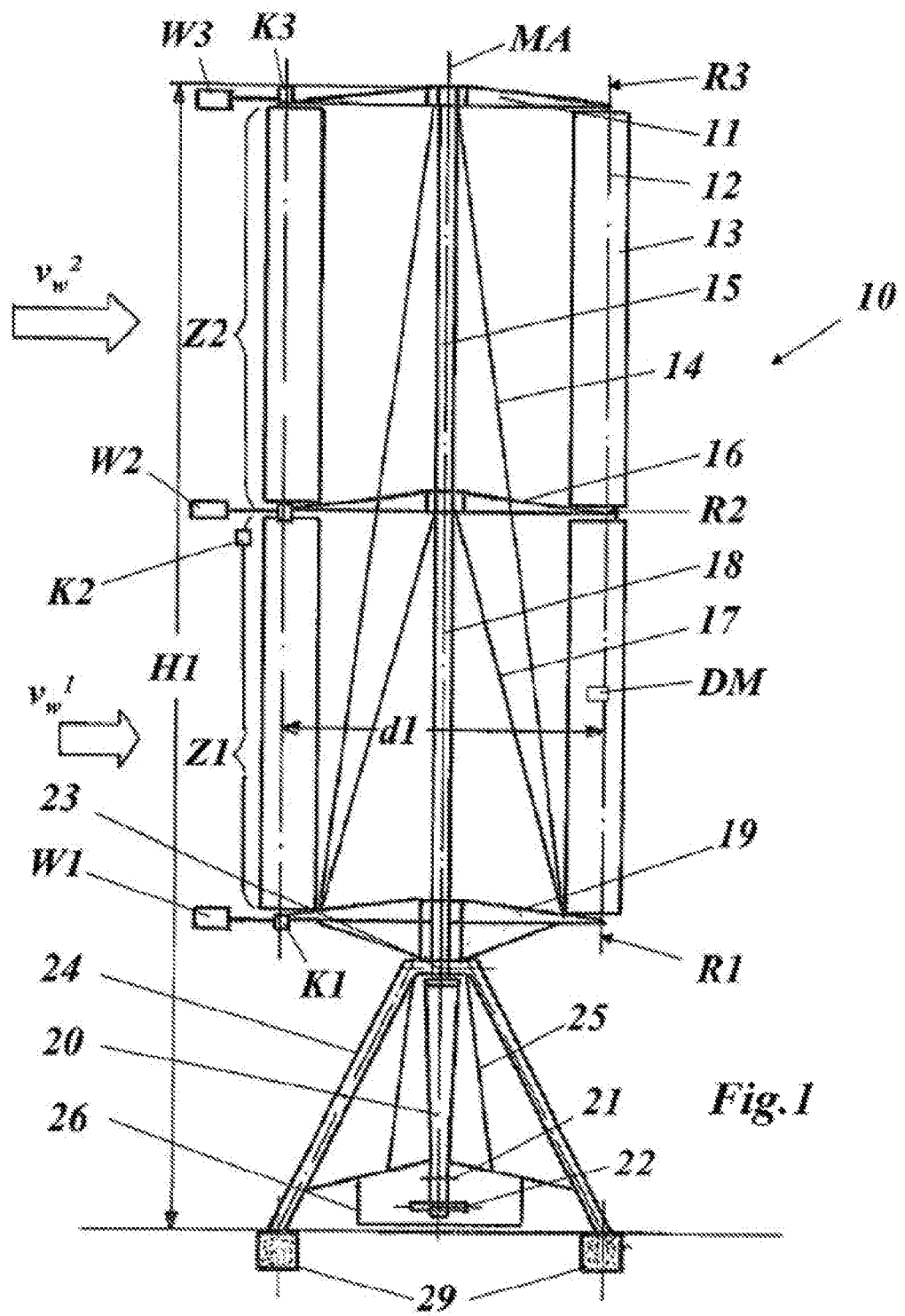
FIG. 1 is a simplified side view of an example of the vertical wind turbine according to the invention with two cells and the lower bearing of main shaft inside a suspended machine house.

In FIG. 1 a simplified side view of an example of the vertical wind turbine according to the invention is provided.

The wind turbine 10 of FIG. 1 includes two cells Z1 and Z2, which are positioned one above the other along a vertical machine axis MA. Each of cells Z1, Z2 has two horizontal rings 11, 16 and 16, 19, which are concentric to the machine axis MA, between which a plurality (in example 3) of vertical blades 13 are rotatably supported, each about its own axis of rotation 12. The middle ring 16 is equally associated to both cells Z1 and Z2.

Figure 2A:
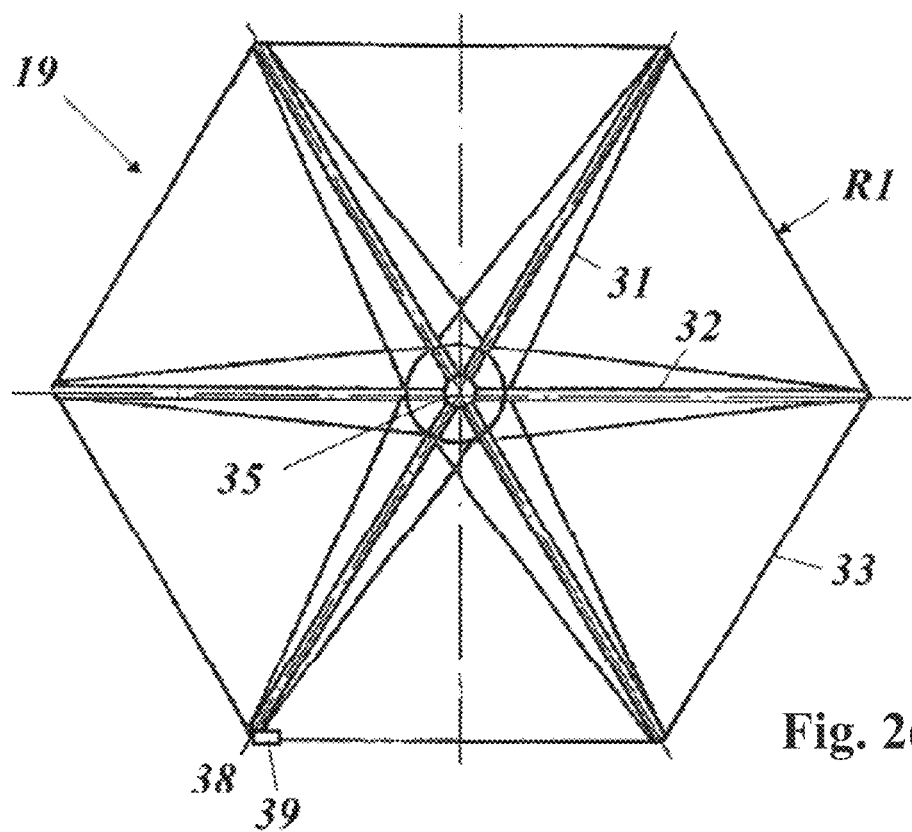
FIG. 2(a) is a plan view of a ring for supporting the blade in the turbine of FIG. 1.
Figure 2B:
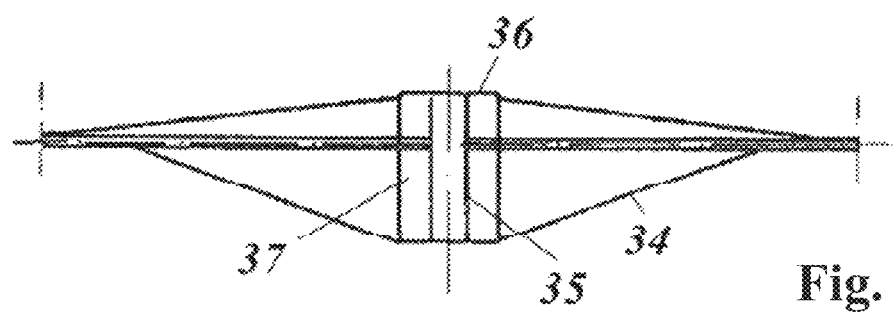
FIG. 2(b) is a side view of the ring of FIG. 2(a)
Figure 3A:
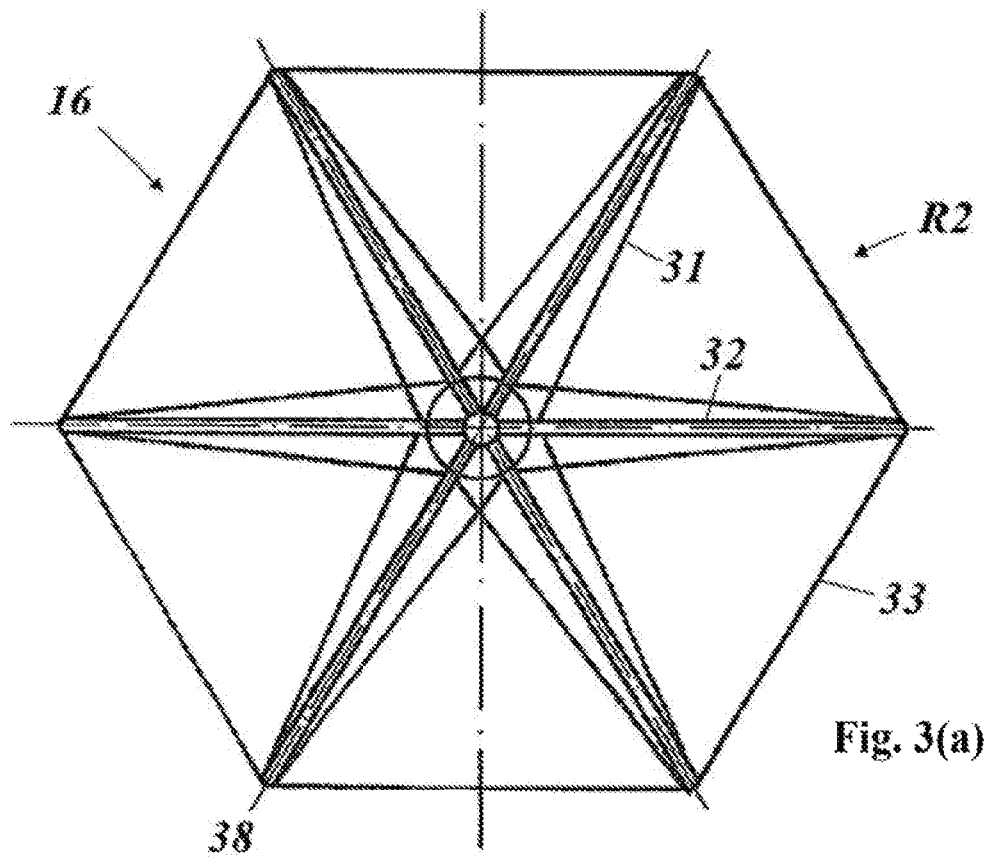
FIG. 3(a) is a plan view of a ring for supporting the blade in the turbine of FIG. 1.
Figure 3B:
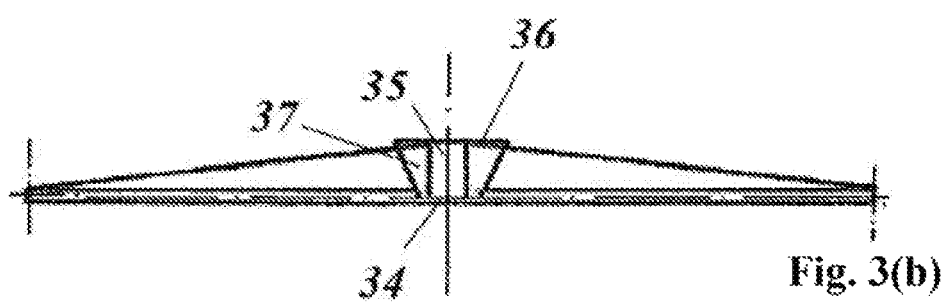
FIG. 3(b) is a side view of the ring of FIG. 3(a)
Figure 4A:
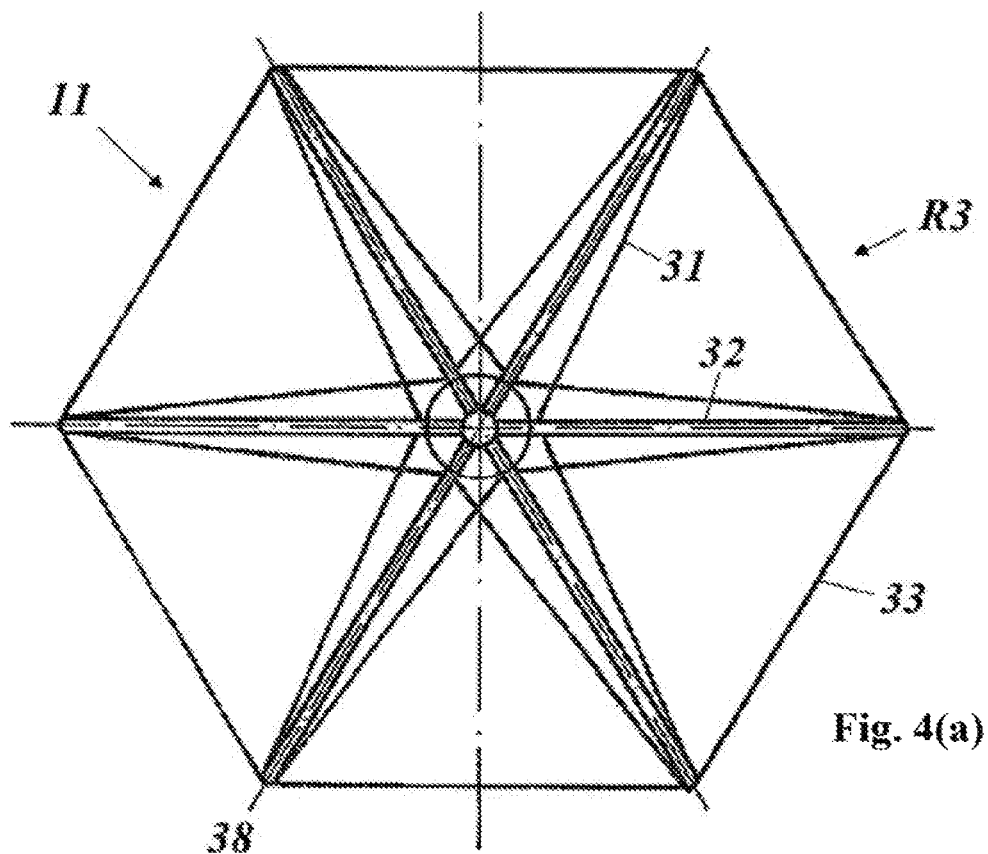
FIG. 4(a) is a plan view of a ring for supporting the blade in the turbine of FIG. 1.
Figure 4B:
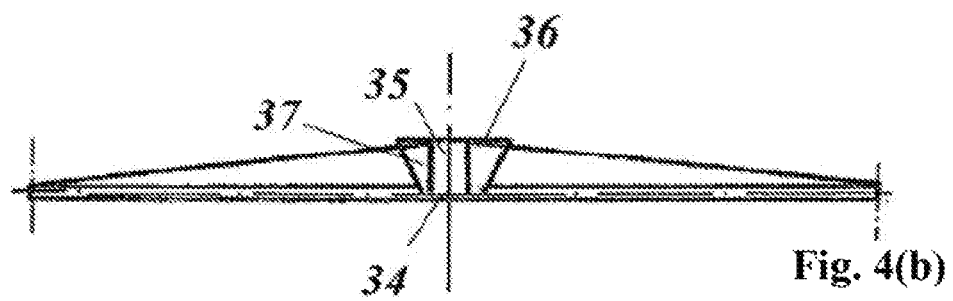
FIG. 4(b) is a side view of the ring of FIG. 4(a)

The structure of rings 11, 16 and 19 is obtained from FIGS. 2, 3 and 4. Each of rings 11, 16 and 19 is an equilateral triangle or a regular polygon, whose corners support the blades 13 by means of a corresponding bearing support 38 (see also FIG. 7). The periphery is provided by rods 33, which are connected to a vertical central pipe 35 by means of radial rods 31 and pipes 32. On the underside of rings, flat irons 34 are used as pulling struts. Radial ribs 37 are positioned around the central pipe 35, wherein the ribs support flanges 36 which are provided at the ends of pipe 35.

Cells Z1, Z2 are non-rotatably connected with their blades 13 through a central pipe 15 and 18 to a vertical main axis 20, which is rotatably supported underneath cells, so that they may rotate about the machine axis MA together with the main axis 20. The main axis 20 is rotatably supported at the upper end in a bearing support 23 with support rollers, which is supported by a frame of obliquely downwards spread pipes 24 on external foundations 29. In the example of FIG. 1, the lower vertical and radial bearings are housed in the generator housing, which is fixed in the machine house 26, which is suspended to the frame 24. In this way more weight can be transferred to the external foundations 29, whereby the stability moment of the entire construction may be increased. Height H1 may for example be 75 m or more (over 200 m, for example). The diameter d1 of the circle, on which the blades 13 are moving with their axis of rotation 12, is 20 m, for example. Each of cells Z1, Z2 experiences, because of its different height, its own wind speed $v_w^1$ and $v_w^2$.

The main axis 20 is composed, in the example of FIG. 5, of a lower cylindrical portion 45 of small diameter, a middle portion 43, which conically widens in an upward direction, and an upper cylindrical portion 41 of greater diameter. Portions 41, 43 and 45 are fastened to each other by flanges 42 and 44. At the upper end of the lower cylindrical portion a supporting roller track 40 is provided, at the lower end of the lower cylindrical portion 45 a bearing pin 46 is provided. Portions have lengths h1, h2 and h3 of, for example, 4 m, 11 m and 0.5 m, respectively.

As is shown in FIG. 1, the lower cylindrical portion 45 supports a rotor 22 of a generator as well as a brake 21, which are both housed in the machine house 26. Cells Z1 and Z2 form, together with the main axis, the rotor of the wind turbine, which rotates about the machine axis MA.

Figure 8:
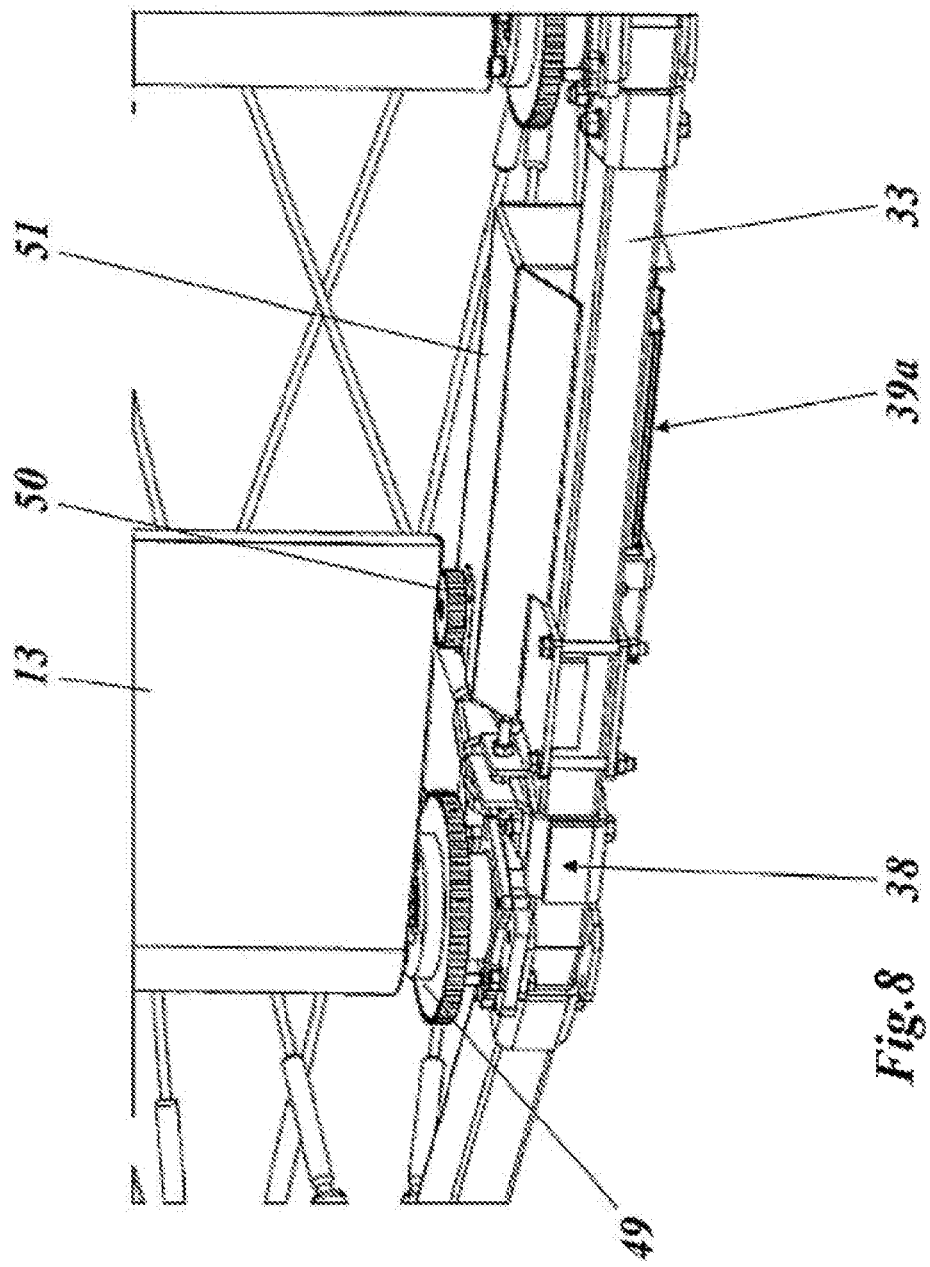
FIG. 8 is a further perspective view of an electric motor mounted on a horizontal lower ring for blade adjustment, which is protected by a cover.

In FIG. 2(a) the position of one of actuators 38 associated to each blade 13 is shown, as an example. The actuator 39 is positioned, in this case, in parallel to rod 33 of ring 19, in direct proximity to bearing support 38 of corresponding blade. This is more clearly shown in the enlarged detail of FIG. 7, where one of actuators, actuator 39a, is parallel to rod 33. The corresponding blade 13 is provided, on its axis of rotation above the bearing support 38 with a first gear 49. The actuator 39a, in this case an electric servomotor, acts through an angular gear 52 upon a second gear 50, which is positioned at the same height of the first gear 49 and which is drivingly connected with the same through a toothed belt (not shown). If the use of an angular gear has to be avoided, the actuator (39b) may also be vertically mounted, however giving rise to an increased flow resistance. The horizontal actuator 39a according to FIG. 8 may be simply provided with a cover 51 for protecting it from environmental agents.

Energy is supplied to actuators 39 or 39a,b through corresponding lines by a central supply unit and these are controlled by control signals according to the settings of a control unit. If hydraulic actuators (motors) are used instead of electric motors, the energy is provided by a central hydraulic unit through corresponding hydraulic conduits.

Figure 11:
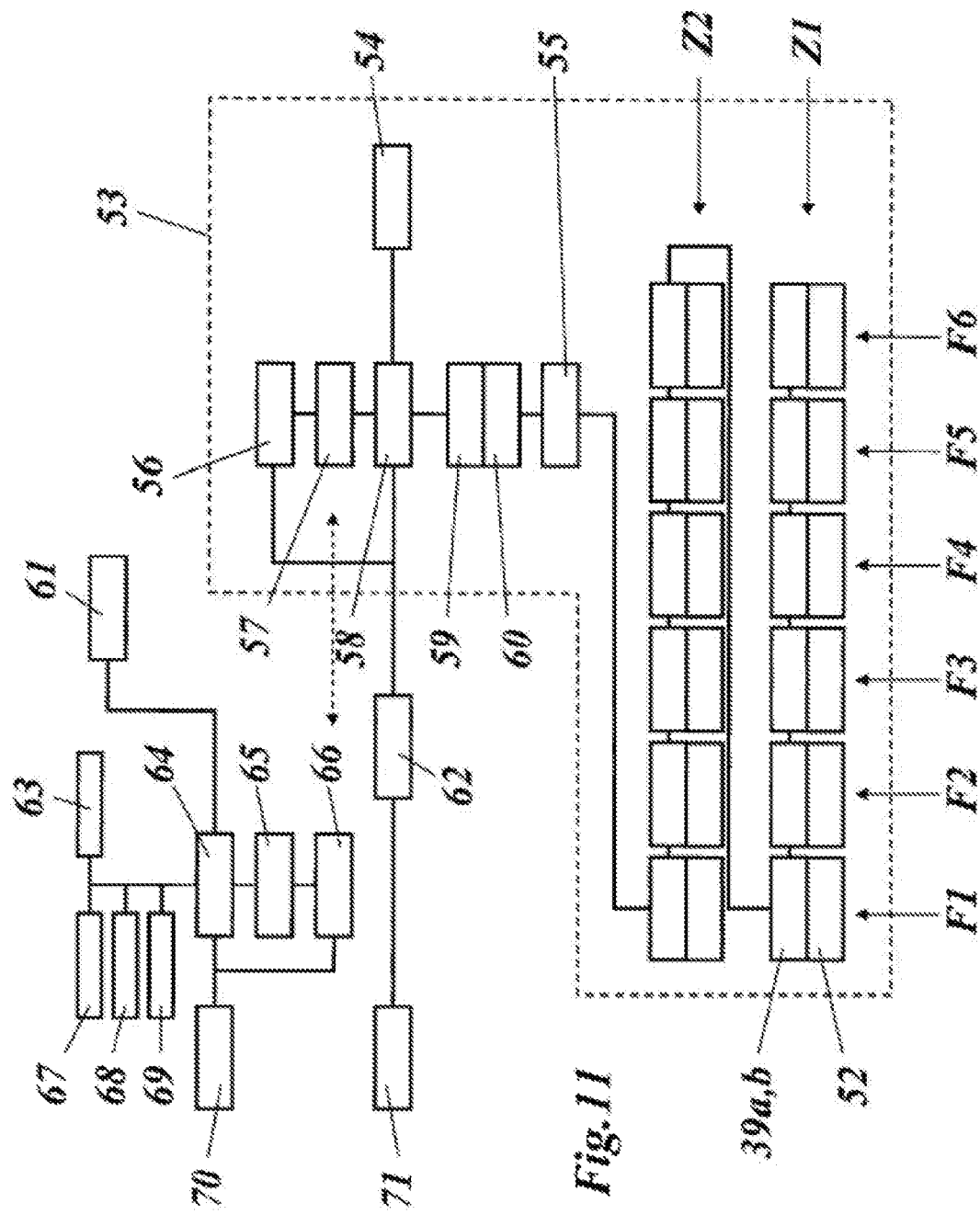
FIG. 11 shows a block diagram of the electromechanical control of the blade position according to an example of the invention.

An overview of the concept of active blade control is provided in block diagram of FIG. 11.

Blades 13 or F1-F6 of cells Z1 and Z2 are actively rotated by actuators 39a (through angular gears 52) or 39b (directly) about their longitudinal axis. Any blade angle (angle between the tangent to the circulation circle of rotor and a cord of blade) may be individually set for each blade in each position on the circulation circle.

The object of the active blade control is to operate with all (example 12) blades 13 or F1-F6 in both cells with a blade angle which varies with the rotor position. Depending on the wind speed and rotational speed of rotor another curve of blade angles with respect to rotor position is operated. To this end, various virtual cam discs are generated, which are stored in a memory. The blade angle then follows the edge curve of the selected virtual cam disc. The zero point of the rotor position is a function of the wind direction. Wind direction and wind speed are measured by an wind speed sensor 67 and a wind direction sensor 68.

The wind measurement is of particular importance in the present turbine of FIG. 1. A vertical wind turbine 10 of the type shown in FIG. 1 has blades 13 which are uniformly shaped along the entire active height of rotor, which, during each rotor rotation may be individually controlled in an optimal way. The angle of attack of blade 13 with respect to relative wind flow should be controlled at each time during the rotor rotation. The blades "fly" during the rotor rotation almost along a circular path having rotor radius, around the rotor center or the machine axis MA and generate a lift in a radial direction and a thrust in a tangential direction. The thrust should be optimized at any given moment so that the turbine 10 experiences a maximum drive.

Because of static and dynamic loads on blades, the rotor is subdivided, along the active height, according to size of wind turbine, into one to four cells (two cells Z1 and Z2 in the example of FIG. 1). Each cell Z1, Z2 contains three blades 13, respectively, which are rotatably supported, on the upper and lower side, at the end of a radial arm 100 (see FIG. 7), so that they are fixedly connected to the center of the rotor. The three arms 100 form a respective fictitious ring on the upper and lower side of each cell.

Since all rotor cells are fixedly connected to the rotor, they also rotate with the same speed of the rotor. The wind direction and speed may however greatly vary along the active height of rotor, in particular in the case of huge (tall) turbines. In order to ensure an optimal thrust control, at each moment during the rotor rotation, the speed and direction of the relative wind flow of each blade should be exactly known. By a static wind measurement, the wind speed and direction may be measured along the height in a vertical direction and at a distance from the rotor (wind measurement pole). Since the wind measurement pole is at a fixed distance from the turbine, in case of an unfavorable wind direction, it will be in the wind shadow of the turbine, and, also because of the distance, will provide incorrect measurements, which do not correspond to the real conditions on the blades.

It is therefore proposed to fix, for each ring, externally on each ring arm 100, a respective wind measurement device W1-W3 (FIG. 1). The wind measurement device W1-W3 will now determine, in each instant in time, during rotor rotation, the exact relative wind flow direction and speed, with respect to the arm 100 and therefore to the blade. The wind measurement device should preferably contain no mechanical-dynamical measurement component, such as wind vane and wind wheel, but instead measure wind direction and wind speed through ultrasound (ultrasound anemometer), since mechanical measurement components may provide incorrect results due to centrifugal acceleration on rotor. The wind measurement device W1-W3 should be at a distance from the arm end, which is sufficient to avoid any influence from the air turbulence zone of the arm end.

It is known that the wind direction and speed may greatly vary along the active height of rotor (wind shear and turbulences). If such phenomena can not be locally and temporally measured with sufficient precision, in order to optimally control the blade 13, the turbine will have a highly reduced aerodynamic efficiency. If the measurement takes place in each cell Z1, Z2 on the upper and lower side of circumference, in a dynamic and temporally proximate way, each blade may also be always controlled at an optimal relative angle of attack. In order to determine the wind conditions at middle height of blade, the respective wind measurements on the upper and lower side of blade have to be mediated, in order to provide the blade control signal. From the measurement of the relative flow, at each moment of time, through the rotor peripheral speed, the absolute wind speed and direction may also be calculated by trigonometric means. Based on these measurements, the optimal tip-speed ratio of turbine and the optimal corresponding blade angle of attack may be determined in a very short time frame.

The measurement device may also determine brief high local turbulences which may lead to a blade and turbine overload. Consequently, an optional relieving blade adjustment or a complete blade disconnection (release) may be performed. Measurements with wind measurement devices W1-W3 on each arm 100 for each ring allow to individually control each cell with their respective blades in an independent manner.

It is also proposed to install on each cell Z1, Z2 on the lower or upper ring, on each arm 100, at the blade bearing, a force measurement device K1-K3 for radial and tangential force direction. Through the tangential force measurement, together with the wind measurement device W1-W3, the blade propulsion and therefore the turbine efficiency may be optimized. Signals from both these measurement devices W1-W3 and K1-K3 shall adaptively improve the efficiency of the turbine by use of a self-learning control program.

The radial force measurement signal should, together with the tangential force measurement signal, constantly monitor the load profile of blade. Through this measurement the frequency and intensity of blade load and therefore of residual operating life of blade may be determined.

As an alternative or in addition to above said force measurement for determining the blade load, a strain gauge may also be provided at blade central surface (for example for blade 13: DM in FIG. 1), which, together with a measurement system measures the frequency and intensity of bending stresses in blade 13. These measurements can then define the residual operating life of blade 13. The method may be complicated by the fact that the measurement signal has to be transmitted from the rotating blade to the ring arm 100. The strain gauge device should however be exclusively used for measuring the blade load, and not for optimization of blade propulsion.

The basic concept of an active blade control is shown in block diagram in FIG. 11. Components, which are surrounded by a dotted line (rotor block 53 in FIG. 11), are mounted inside an electrical cabinet on the rotor. The communication with the tower control and the data acquisition run over a Wi-Fi connection with corresponding Wi-Fi transmitters 57 and 66. The power supply by an alternating current voltage supply 71 (3×400 VAC, 1× neutral and 1× ground) runs through a collector ring 62. Functional blocks provided on rotor are supplied by a 24 VDC-voltage supply 56. An analog 24 VDC voltage supply 65 is also provided outside the rotor.

The virtual cam discs (different blade angle curves according to rotor position) are stored on the rotor (motion controller 58). They may also be changed through the Wi-Fi connection. Wind speed, wind direction and rotor speed are processed on the tower (not rotating) through an I/O of a programmable logic controller (PLC) 64, which is operating with a computer 70. The virtual cam disc which has to be taken, is communicated through the Wi-Fi connection to the motion controller 58 on rotor. I/O are available on the rotor as well as on the tower.

The 6 actuators 39a or 39b in the simplest case follow the same cam disc, however with an angular offset of 120° (for example with 3 blades for each cell). The zero value of the rotor position depends on the wind direction. If, in case of higher systems, and/or with more than two cells, the wind speeds for the cells are very different from each other, for each of cells a corresponding virtual cam disc is selected according to the corresponding wind speed. For each cell Z1, Z2 a corresponding wind speed ($v_w$) is determined, depending on the height above ground, and the angular position of individual blades 13, F1-F6 of cell is actively controlled according to the wind speed ($v_w$) determined for the cell. Since the dependence of the wind speed from height over ground follows a standard curve, it is sufficient to measure the wind speed at a height, in order to determine on its basis the values for other heights. All cells have the same rotational speed about the machine axis MA, but because of the different heights, they have different wind speeds. Correspondingly different tip-speed ratios are obtained, which then are averaged for the entire system and have to ensure a maximum of energy production.

The electric cabinet with the motion controller 58 is provided on the rotor. The rotor position should also be sensed on the rotor. To this end, a corresponding encoder may be used. In the example of FIG. 11, a transducer for zero position 54 is instead provided. The rotor rotational speed is determined on the tower. The resulting step impulses are read through an PLC 64 and are transmitted through the Wi-Fi connection to the motion controller 58 on the rotor.

The active blade control receives a plurality of incoming signals, directly from a measurement system, which includes the wind speed sensor 67, the wind direction sensor 68 and possibly a rotor torque sensor 69. In addition, impulses for the rotational speed are supplied. Based on these input signals, the blade control 64 determines how the individual blades have to be controlled (which cam discs are used, where is the zero point of the rotor position). The control signals from the motion controller 58 flow through a power module 59 to an output module 60 and from here through a distribution box 55 to the individual actuators 39a and 39b.

The profile of blade angle is periodically newly selected (different cam discs). The wind direction defines the zero position of rotor. Based on the input signals required for adjustment, a median over a predetermined time is calculated. Both the refresh time and the time window for the averaging of the adjustment parameters should be freely selectable. A specific control 61 may provide commands for the switching off of turbine or rotational speed reduction.

The maximum number of different blade angle profiles (virtual cam discs), which may be defined, is limited by the motion controller 58 and may for example be equal to 99. The blade angle profile to be used depends on the operating conditions and the tip-speed ratio $\lambda$ of the turbine. The tip-speed ratio is calculated in a way known per se, from the wind speed $v_w$ and the rotor speed (or the rotor peripheral velocity).

The theoretical optimal blade angle profile for a blade 13 has been calculated by means of an analytical model for different tip-speed ratios. An example of a tip-speed ratio of 0.4 (a) together with a schematic view of the physical positions of blades each 30° (b) is shown in FIG. 9.

Figure 9A:
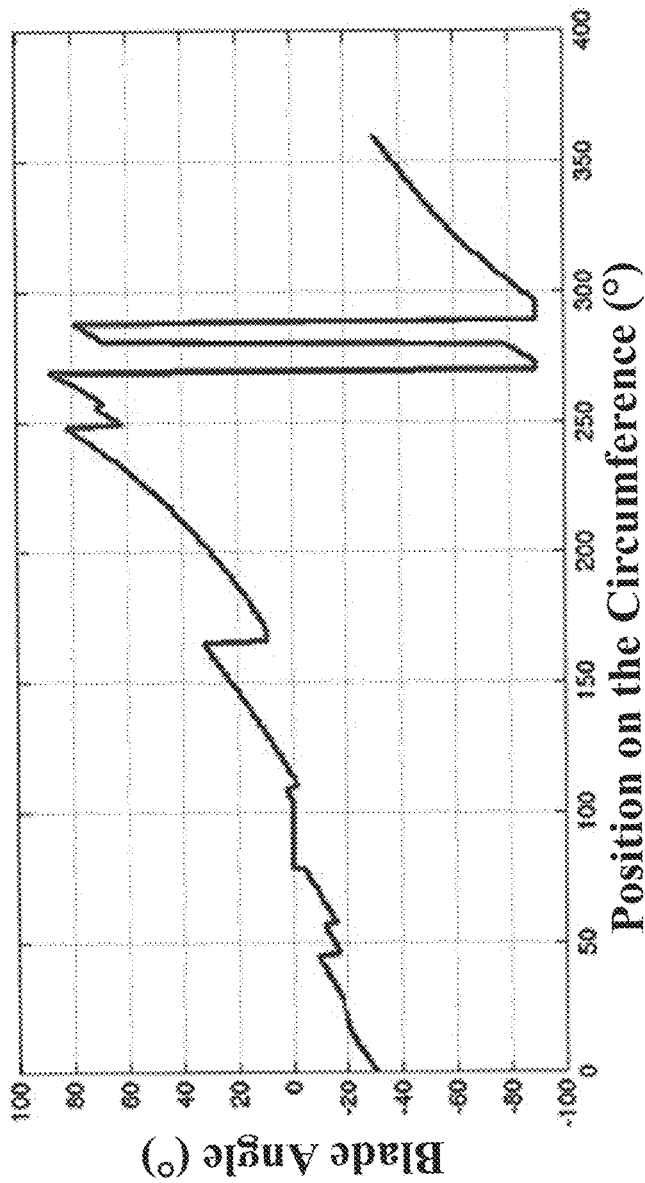
FIG. 9(a) depicts the calculated optimal blade position through a 360° rotation of turbine with a tip-speed ratio of 0.4 in a diagram.
Figure 9B:
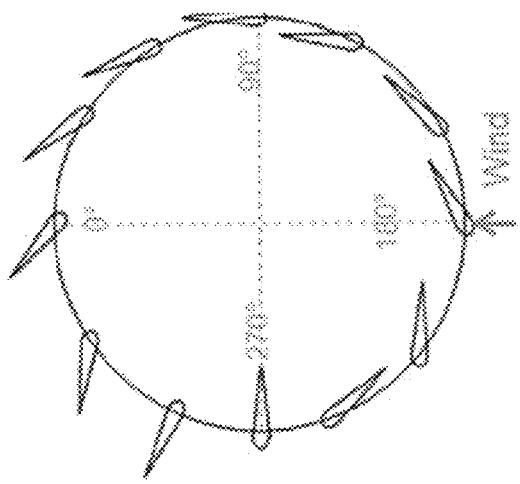
FIG. 9(b) depicts the calculated optimal blade position through a 360° rotation of turbine with a tip-speed ratio of 0.4 in an axial view from above.
Figure 10:
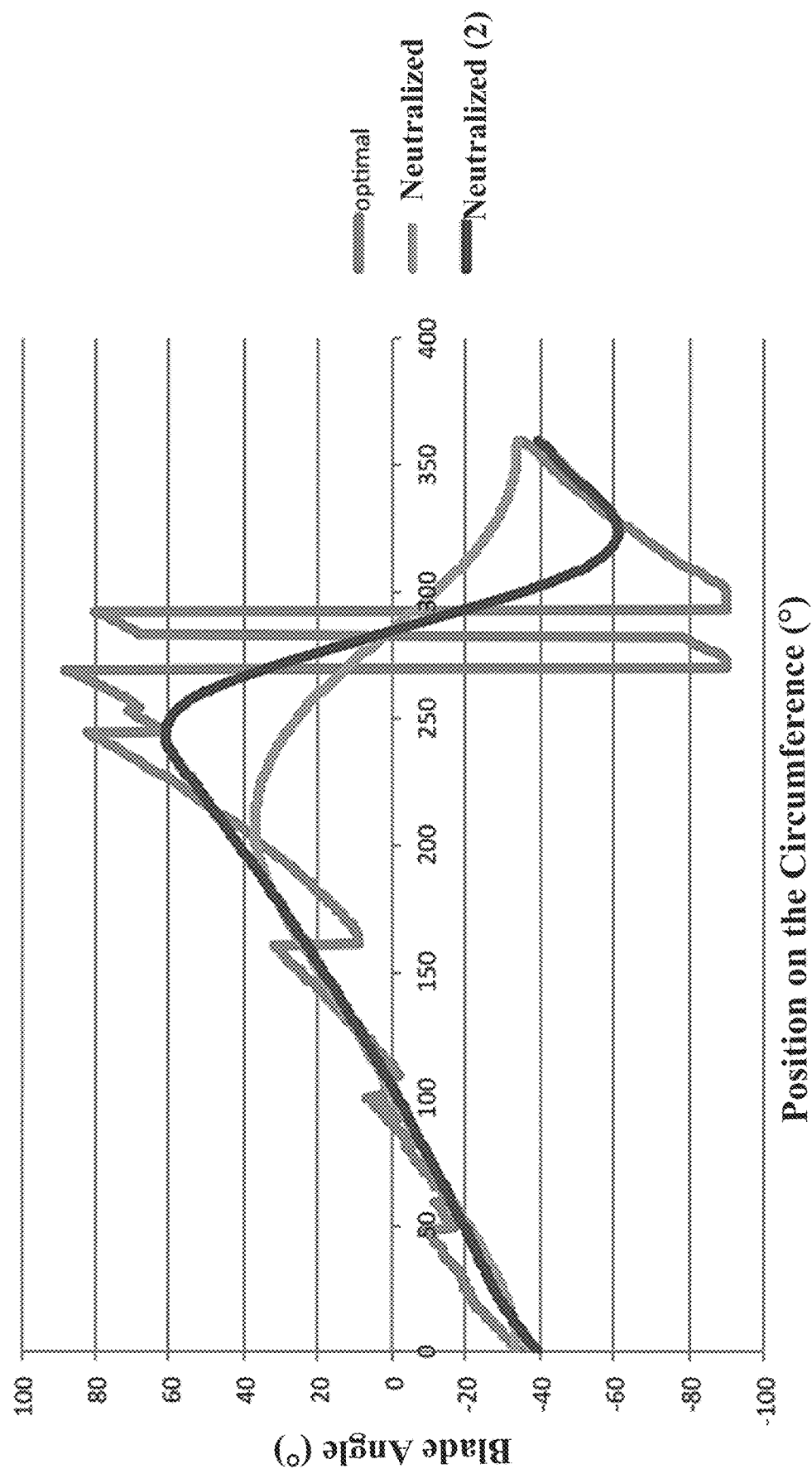
FIG. 10 shows neutralized blade control curves, which consider the technical limits of driving means.

It is to be noted that the maximal accelerations in FIG. 9 are not reached in reality. The optimal blade angle profiles are therefore neutralized and the resulting characteristics are compared with typical proprieties of available drive motors. An example of two different neutralizations is shown in FIG. 10.

Blades are positioned according to a virtual lead axis. The lead axis is determined by a NULL-impulse (zero position 54) and the rotational speed. The PLC 64 stores with a predetermined frequency the current wind speed, the rotor speed and the wind direction. The median is periodically calculated based on the wind speed and rotor speed. These provide the averaged tip-speed ratio $\lambda$ by calculation through the last time window, and the cam disc is selected. The median of the wind speed is also periodically calculated. It then allows the NULL position of the cam disc to be determined.

If the tip-speed ratio of turbine is <0.4 a constant blade angle profile is used, in order to increase the rotational speed. As soon as the tip-speed ratio is >0.4, the turbine is operative.

When the power is decreased, the wind turbine is decelerated by the generator, in order to set the speed to zero. The blade control receives from control 61 of system a signal that indicates that the operating condition ramp down has been reached and the blade drives 39a and 39b are de-energized or, in case of a hydraulic drive, the hydraulic motors are released.

The rotor speed is 0 and brakes of wind turbine are closed. The blade control is not deactivated, so that it doesn't lose the rotor position. The motors are de-energized or the hydraulic motors have no oil pressure. The blades 13 therefore align with the wind.

The wind turbine is decelerated by the brake 21 as quick as possible. The blades 13 are physically current-free or oil pressure free in case of actuation of the emergency command.

Figure 12:
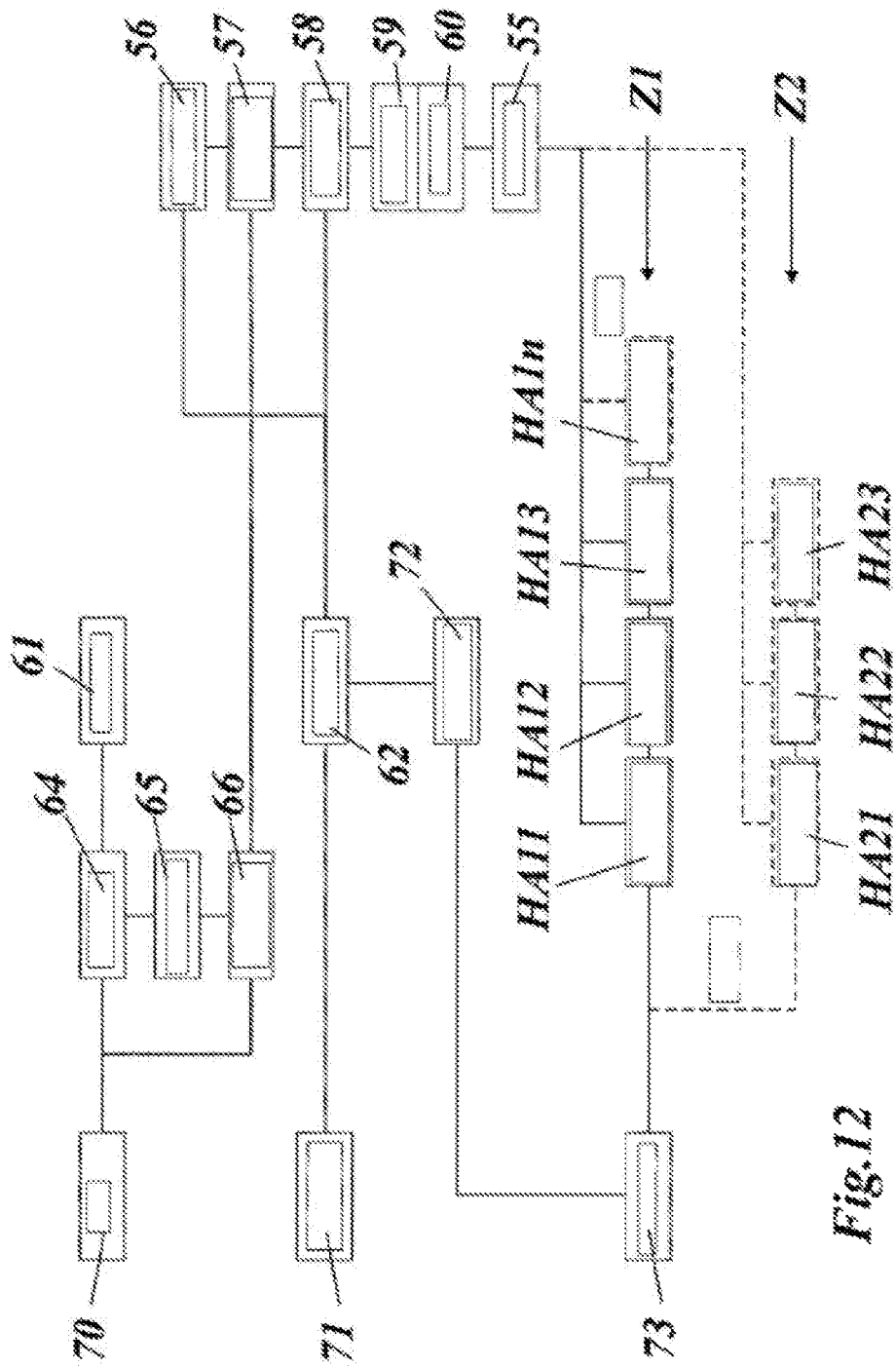
FIG. 12 shows a block diagram of the electromechanical control of the blade position according to another example of the invention.

A block diagram which is analogous to FIG. 11 for the electro-hydraulic control of blades in cells is shown in FIG. 12. The hydraulic actuators HA11-HA1$n$ and HA21-HA23, provided for actuating the individual blades and which are provided with the required valves and activation, are supplied with oil pressure through hydraulic conduits in cells by one (or more) central (positioned in the center of rotor) hydraulic aggregate(s) 73. The one or more hydraulic aggregates 73 obtain their operating current from their own voltage supply 72, which is connected to the energy transmission (collector ring 62).

The hydraulic actuators HA11-HA1$n$ and HA21-HA23 may be particularly compact and provide high adjustment forces. By opening the corresponding valves, it is very easily possible to ensure the necessary freewheeling of blades.

While several embodiments of the invention are shown in the accompanying figures and described in detail above, other embodiments will be apparent to, and readily made by, those skilled in the art without departing from the scope and spirit of the invention. Accordingly, the foregoing description is intended to be illustrative rather than restrictive. The invention described above is defined by the appended claims and all changes to the invention that fall within the meaning and range of equivalency of the claims are to be embraced within their scope.

LIST OF REFERENCES 10 wind turbine (vertical)
11 upper ring
12 axis of rotation
13 blade
14, 17 rod
15, 18 pipe
16 middle ring
19 lower ring
20 main shaft
21 brake
22 rotor (generator)
23 bearing mount
24 pipe
25 rod
26 machine house
29 foundations
31, 33 rods
32 pipe
34 plane
35 pipe
36 flange
37 rib
38 bearing support
39 actuator (blade)
39a, b servomotor
40 supporting roller track
41 upper portion (cylindrical)
42, 44 flange
43 middle portion (conical)
45 lower portion (cylindrical)
46 lower bearing pin 47, 48 bearing (for example, self-aligning roller or ball bearings)
49, 50 gear
51 cover
52 angular gear
53 rotor block
54 zero position
55 distribution box
56 24 VDC voltage supply
57 Wi-Fi transmitter
58 motion controller
59 power module
60 outlet module
61 control
62 collector ring
63 impulse for rotational speed
64 PLC
65 24 VDC voltage power supply
66 Wi-Fi transmitter
67 wind speed sensor
68 wind direction sensor
69 rotor torque sensor
70 computer
71, 72 alternate current power supply
73 hydraulic aggregate
100 radial arm
dl diameter
DM strain gauge
FP blade profile
F1-F6 blades
HA11-
HA ln hydraulic actuators (integrated with valves and activation)
HA21-
HA23 hydraulic actuators (integrated with valves and activation)
H1 total height
h1-h3 height
K1-K3 force measurement device
MA machine axis
W1-W3 wind measurement device
Z1, Z2 cell

What is claimed:

1. A vertical wind turbine, comprising a plurality of vertical blades and a plurality of radial arms, with each blade of the plurality of blades supported at a distal end of at least one radial arm of the plurality of radial arms, so that the blades are rotationally fixed with a main shaft of the wind turbine, wherein the blades are each individually mounted at said end of the respective at least one radial arm so as to be able to rotate about a vertical axis of rotation running internally through each of the blades, wherein to each of the blades means are associated, so that the blade is made to adopt, during the circulation about the machine axis and independently of the other blades, an angular position about the respective axis of rotation of the blade, wherein on said end of the respective at least one radial arm, a wind measurement device is fixed, and wherein the wind turbine is configured to actively control said angular position according to measured values of a relative wind speed, a relative wind flow direction, a rotational speed of the wind turbine, and a position of the individual blade along the circulation of the individual blade around a machine axis of the wind turbine.

2. The vertical wind turbine according to claim 1, wherein the wind measurement device is positioned at a distance from the end of the arm, the distance from the end of the arm is sufficient to avoid any influence of an air turbulence zone of the arm end on the wind measurement device.

3. The vertical wind turbine according to claim 1, wherein the wind measurement device on each arm allows to individually control the respective blade in an independent manner.

4. The vertical wind turbine according to claim 1, wherein the rotational position is determined depending on at least one of a relative wind flow direction and a relative wind speed with respect to the blade.

5. The vertical wind turbine according to claim 1, wherein the wind measurement device is an ultrasound anemometer.

6. The vertical wind turbine according to claim 1, wherein on each arm, at a blade bearing, a force measurement device for radial and tangential force direction is provided.

7. The vertical wind turbine according to claim 1, wherein at least three arms form a ring.

8. The vertical wind turbine according to claim 7, wherein the blades are positioned on the ring in order to rotate through 360°.

9. The vertical wind turbine according to claim 7, wherein the blades are rotatably supported at an end of each blade on the ring.

10. The vertical wind turbine according to claim 7, wherein the means for changing the angular position of the blades are positioned on the ring.

11. The vertical wind turbine according to claim 10, wherein the means for changing the angular position of the blades comprise an electrically driven motor or a hydraulically driven motor.

12. The vertical wind turbine according to claim 11, wherein a rotational movement of the motor is directly transmitted to the corresponding blade.

13. The vertical wind turbine according to claim 11, wherein the hydraulically driven motor is positioned with a motor axis in a plane of the rings.

14. The vertical wind turbine according to claim 11, wherein the hydraulically driven motor has a motor axis extending perpendicularly to a plane of the rings.

15. The vertical wind turbine according to claim 11, wherein the rotational movement of the electrically driven motor is transmitted by gears to the corresponding blade.

16. The vertical wind turbine according to claim 15, wherein the electrically driven motor is positioned with a motor axis in a plane of the rings, and wherein the rotational movement of the electrically driven motor is transmitted between the gears by a toothed belt.

17. The vertical wind turbine according to claim 15, wherein the electrically driven motor has a motor axis extending perpendicular with respect to a plane of the rings, and wherein an angular gear is interposed for transmitting the rotational movement.

18. The vertical wind turbine according to claim 1, wherein the main shaft comprises a plurality of portions, the plurality of portions are serially positioned in the axial direction, and wherein the plurality of portions is connected to each other by flanges.

19. The vertical wind turbine according to claim 18, wherein the main shaft comprises a lower cylindrical portion, a middle portion, and an upper cylindrical portion, wherein the middle portion conically widens in an upward direction, and wherein the upper cylindrical portion has an outer diameter, which outer diameter is greater than an outer diameter of the lower cylindrical portion.

20. The vertical wind turbine according to claim 19, wherein the lower cylindrical portion supports a rotor of an electrical energy generating generator.

21. The vertical wind turbine according to claim 1, wherein, for rotatably supporting the main shaft, a bearing pin is provided at a lower end of the main shaft and a supporting roller track is provided at an upper end of the main shaft.

22. The vertical wind turbine according to claim 1, wherein an upper bearing of the main shaft is a supporting roller bearing, absorbs vertical upper reaction wind forces of the main shaft, and is supported by a supporting frame, the supporting frame obliquely widens up in a downward direction, on foundations positioned outside the machine axis, wherein lower axial and radial bearings of the main shaft are housed inside a generator housing, the generator housing is fixed to upper struts inside the machine house, and wherein the machine house is suspended from the supporting frame.

23. A method for operating a vertical wind turbine, wherein an angular position of an individual blade of a plurality of blades of the wind turbine around a respective axis of rotation of the individual blade is actively controlled, independently from the other blades of the plurality of blades, according to measured values of a relative wind speed, a relative wind flow direction, a rotational speed of the wind turbine, and a position of the individual blade along the circulation of the individual blade around a machine axis of the wind turbine, wherein each blade of the plurality of blades is supported at a distal end of at least one radial arm of a plurality of radial arms, and wherein on said end of the respective at least one radial arm, a respective wind measurement device is fixed for determining the relative wind flow direction and the relative wind speed with respect to the respective blade.

24. The method according to claim 23, wherein the wind measurement device determines in each instant in time during circulation of the respective blade around the machine axis, the relative wind flow direction and speed, with respect to the at least one arm and therefore to the respective blade.

25. The method according to claim 23, wherein for a blade angle describing a deviation of the respective blade from a base position, in a tangential direction with respect to a circulation circle around the machine axis, virtual cam discs are provided, the virtual cam discs define a variation of the blade angle with the position of the respective blade on the circulation circle, and wherein the active control of the respective blade is performed according to the virtual cam discs.

26. The method according to claim 25, wherein for selecting the virtual cam discs used for the active control of the respective blade, a tip-speed ratio of the wind turbine is continually determined, wherein the tip-speed ratio indicates a ratio of a peripheral velocity of the respective blade to wind speed, and wherein according to the determined tip-speed ratio, the virtual cam disc used for active control of the respective blade is selected or different virtual cam discs are exchanged.

27. The method according to claim 25, wherein the virtual cam discs are referenced to a zero position of the wind turbine, and wherein the zero position depends on the relative wind flow direction.

28. The method according to claim 23, wherein the measurement device is adapted to determine brief high local turbulences which may lead to a blade and turbine overload, for performing a relieving blade adjustment or a complete blade disconnection.

\* \* \* \* \*

UNITED STATES PATENT AND TRADEMARK OFFICE
CERTIFICATE OF CORRECTION

PATENT NO. : 10,871,143 B2  
APPLICATION NO. : 16/165605  
DATED : December 22, 2020  
INVENTOR(S) : Karl Bahnmüller et al.

Page 1 of 1

It is certified that error appears in the above-identified patent and that said Letters Patent is hereby corrected as shown below:

In the Claims

Column 11, Line 54, Claim 1, after "during" delete "the"

Column 13, Line 20, Claim 23, after "from" delete "the"

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*